United States Patent Office 3,832,252
Patented Aug. 27, 1974

3,832,252
METHOD OF MAKING A DRUG-DELIVERY DEVICE
Takeru Higuchi, 2811 Schwarz Road, Lawrence, Kans. 66044; and Harold M. Leeper, 1040 Gest Drive, Mountain View, Calif.
Original application Sept. 29, 1970, Ser. No. 76,499, now Patent No. 3,710,795. Divided and this application Oct. 2, 1972, Ser. No. 293,919
Int. Cl. A61j 3/00
U.S. Cl. 156—86                    4 Claims

ABSTRACT OF THE DISCLOSURE

Drug-delivery device for releasing drug at a controlled rate for a prolonged period of time is formed from a solid inner matrix material having drug dispersed therethrough. Surrounding the inner matrix is an intimately contacting outer polymeric membrane, insoluble in body fluids, which contracts about the matrix as the matrix decreases in volume upon drug release. Both the inner matrix material and the outer polymeric membrane are permeable to passage of the drug by diffusion but the drug diffuses through the outer polymer membrane at a lesser rate so that passage through the polymeric membrane is the drug release rate controlling step. The integrity of the intimate contact between the membrane and the matrix is assured even upon matrix depletion immediately following manufacture and for an extended period of time by reason of the reserve elastic recovery stress in the membrane.

---

This is a division of application Ser. No. 76,499, filed Sept. 29, 1970, now U.S. Pat. No. 3,710,795.

BACKGROUND OF THE INVENTION

This invention relates to a drug-delivery device for releasing drug at a controlled rate for a prolonged period of time.

In copending application Ser. No. 42,786, filed June 2, 1970, and assigned to the assignee of the present, the disclosure of which is hereby incorporated by reference and is relied upon, there is described and claimed a drug delivery device which can release drug at a controlled rate which does not vary with time. This device is formed from a solid inner matrix material having solid particles of drug dispersed therethrough. Surrounding the inner matrix is a polymeric membrane, insoluble in body fluids. Both the inner matrix material and the polymeric membrane are permeable to passage of the drug by diffusion but the drug diffuses through the polymeric membrane at a lesser rate so that passage through the polymeric membrane is the drug release rate controlling step. For best results, the rate of passage of drug through the polymeric membrane does not exceed the rate of removal or clearance of drug from the exterior of the device by body tissues or fluid. This ensures that the drug-delivery rate is dependent on diffusion through the polymeric membrane, which can be controlled, rather than upon clearance, which varies.

Despite the attractiveness of the device immediately above described, the possibility exists that diffusion of the drug through the walls of the membrane will tend to diminish the volume of the drug matrix and interrupt the intimacy of contact between matrix and membrane. Possible gas pockets or voids thus formed, and concomitantly a further loss of intimacy of contact between the matrix and the membrane, can slow up release of the drug through the membrane and introduce an uncontrollable factor into the drug release mechanism.

SUMMARY OF THE INVENTION

Accordingly, a primary objective of this invention is to provide a drug-delivery device comprised of a solid inner matrix material and an enveloping polymeric membrane for prolongedly releasing drug at a controlled rate.

Still another object of this invention is to provide a drug-delivery device which can release drug at a rate which does not vary with time.

Another object of the invention is to provide a drug-delivery device comprised of a solid inner matrix material and an enveloping polymeric membrane, such that intimate contact of the membrane with the matrix is assured immediately following manufacture and for extended period of time thereafter.

Yet another object of the invention is to provide a membrane/matrix drug-delivery device characterized by a zero order time dependence rate of release, even though the matrix or some part thereof is depleted by permeation loss through the membrane into an external environment.

In attaining the objects of this invention, one feature resides in a drug-delivery device comprising a solid inner matrix material having drug dispersed therethrough, the inner matrix being permeable to passage of the drug by diffusion. Surrounding the inner matrix is a polymeric membrane, insoluble in body fluids and permeable to passage of the drug by diffusion but at a lower rate than through the inner matrix. The membrane is a heat shrinkable polymeric membrane stretched and set into the stretched state prior to its use as the enveloping skin for the medicament-containing inner matrix, and, upon enclosing the drug matrix therewith, the membrane is contracted about the inner matrix by a brief exposure to heat. Drug diffuses through the inner matrix to and through the polymeric membrane at a controlled rate over a prolonged period of time. And the integrity of the intimate contact between the membrane and the matrix is assured immediately following manufacture and for an extended period of time thereafter, by reason of the reserve elastic recovery stress in the membrane.

Another feature of this invention resides in a method for making a drug-delivery device in which drug is dispersed throughout a polymeric matrix permeable to passage of the drug by diffusion. The matrix is sealed within a heat shrinkable, stretched, polymeric membrane, also permeable to passage of the drug by diffusion, by enveloping the matrix with the membrane and heating to contract the membrane about the matrix.

Other objects, features and advantages of this invention will become more apparent from the following detailed description of the invention and from the drawings.

BRIEF DESCRIPTION OF THE DRAWINGS

In the drawings, wherein like reference numerals designate like parts.

DETAILED DESCRIPTION OF THE INVENTION

Figure 1:
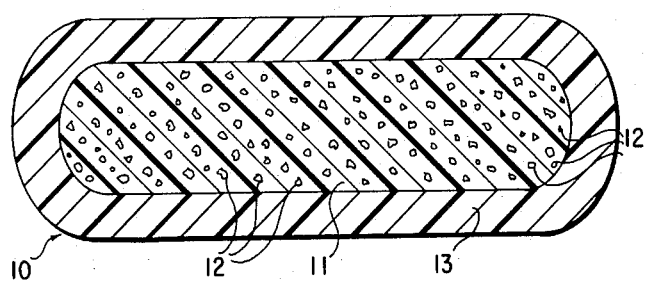
FIG. 1 is a side cross-sectional view of the drug-delivery device of the invention.

As illustrated in FIG. 1, the drug-delivery device 10 of the invention has an inner solid matrix 11 with solid particles of drug 12 dispersed therethrough. Surrounding matrix 11 is polymeric membrane 13 which contracts about matrix 11 as the matrix decreases in volume with loss of drug therefrom. Both matrix 11 and polymeric membrane 13 are permeable to passage of the drug by diffusion, that is, molecules of the drug can dissolve in and diffuse through these materials. However, the permeability of matrix 11 to diffusion of the drug is greater than that of polymeric membrane 13 and polymeric membrane 13 thus acts as the rate-limiting barrier for drug release.

The inner matrix serves as a mass transfer conductor for the drug. Drug molecules, from the surface of the dispersed solid particles, dissolve in the matrix and move through the matrix by diffusion thereby evenly bathing the inner surface of the polymeric membrane with drug molecules. These drug molecules then dissolve in and migrate through the polymeric membrane, at a lower rate than through the matrix, ultimately reaching the outer surface of the polymeric membrane. Ordinarily, one would expect the drug migration to cease when sufficient drug has reached the outer surface of the polymeric membrane to create an equilibrium. However, when the drug-delivery device is in contact with body tissues or fluids, drug molecules are continuously removed from the outer surface of the polymeric membrane and absorbed by the body. For best results, the rate of passage of drug through the polymeric membrane should not exceed the rate of removal or clearance of drug from the exterior of the device by body tissues or fluids. This ensures that the rate of drug release from the device is dependent on diffusion through the polymeric membrane, which can be controlled, rather than upon clearance of drug from the surface of the device, which varies.

The drug-delivery device of the invention provides many important advantages over previous systems. Through the unique design employed, a rate of drug release having a zero order time dependence can be obtained. In addition, because the matrix material serves to transfer drug molecules to all areas of the inner surface of the polymeric membrane, the interior of the device remains in contact with the polymeric membrane which remains substantially at the thermodynamic activity corresponding to that of the solid drug until substantially all of the drug has been released from the device by diffusion through the polymeric membrane. Thus, in contrast to previously proposed diffusion controlled drug-delivery systems, the rate of release of drug from the system of the invention remains not only constant but assured until the device has substantially completed its function.

The polymeric membrane, which acts as the rate-controlling barrier, is formed of a material permeable to the drug, to permit passage of the drug by diffusion through the membrane at a relatively low rate. Normally, the rate of passage of the drug through the membrane is dependent on the solubility of the drug therein, as well as on the membrane thickness. This means that selection of appropriate materials for fabricating the membrane will be dependent on the particular drug to be used. By varying the composition and thickness of the membrane, the dosage rate per area of the device can be controlled; for the membrane acts to meter the flow or diffusion of drug from the matrix to the exterior of the device. Thus, devices of the same surface area can provide different dosage of a drug by varying the characteristics of the membrane wall.

The polymeric membrane is additionally selected from the class of heat shrinkable polymeric films in the form of tubes, spheres, ellipsoids, envelopes, etc., which have been prepared by inducing strong molecular orientation by uni-axially or bi-axially stretching of the film, which operation, preferably, can be preceded by the introduction of inter-molecular primary valence cross-linkage by chemical or radiation processes. The degree of cross-linking, when employed, should be sufficient to impart to the film a thermoset character, which can be conveniently defined as the ability to exhibit a minimum tensile strength of about 50 lbs./in.$^2$ at a temperature of 300° F. By "heat shrinkable" is meant that the film can contract by at least 10% and typically from about 25% to 75% of its stretched dimension in one or more directions upon heating.

The membrane is expanded or stretched mechanically, hydraulically, or pneumatically, either uni-axially or bi-axially, at room temperature or elevated temperatures, and then is set or fixed, i.e., "frozen," into this expanded, high energy state. Procedures for accomplishing this are well known in the polymer fabrication art.

For example, in the manufacture of bi-axially oriented, heat shrinkable film (used in Example I), the film is prepared by extrusion through a shaping die with a long narrow horizontal slit of such width as to give the desired film thickness. As the hot ribbon of polymeric material issues from the die, it is gripped along its two edges by tenter hooks which tend to stretch the film along its width and to stretch it in a forward direction at the same time. This operation imparts bi-axial orientation and yields a film with equal shrinkage along both axes. Typically, such a film will have a potential shrinkage of 50% in both directions. Not only is the rate of stretching important in achieving this result, but the rate of cooling and the temperature profile during the stretching are important. As described here, this operation is done in-line with extrusion, but it can also be done on preformed film by heating and stretching the film.

In the manufacture of one type of heat shrinkable tubing (that used in Example II) for use in the present invention, the polymer is first prepared in tubular shape, preferably by extrusion through a die of the desired cross-sectional configuration. The tubing can then be subjected to ionizing radiation consisting of a stream of high energy electrons as delivered by a Van de Graaff generator or other electron accelerating equipment. Or the tubing can be treated with gamma rays as emanating from Cobalt-60. The dosage delivered can vary, depending upon the polymer system, from 0.5 to 100 megarads to achieve the desired degree of intermolecular cross-linkage. The tubing is then subjected to uniaxial molecular orientation by drawing it, optimally in a warm or heated condition, over an appropriately shaped mandrel, which increases the cross-sectional area by a factor of 2 to 16. The polymer, having been selected from classes which tend to have high intermolecular attraction, will tend to remain in the high energy, stretched state until heated above a temperature at which these intermolecular attractions are melted or released. The "memory" or tendency to recover back to the unstretched state is encouraged by the cross-linkage which was introduced by the earlier radiation treatment.

The drug matrix is tightly enveloped with the membrane and the wrapped system is heat shrunk, for example, briefly (e.g., for less than about one minute) exposed to elevated temperatures, advantageously in the range of from about 200 to 400° F. The system is so selected that shrinkage of the membrane is restricted by the volume of the matrix such that very intimate contact is obtained, and there is sufficient reserve elastic recovery stress in the membrane to provide for and assure continuous contraction about the matrix as the latter decreases in volume by reason of diffusion of the drug through the walls of the membrane. Thus, a constant rate of permeation of the membrane by the drug is achieved owing to the prolongedly uniform contact between the drug matrix and the membrane.

Materials used to form the membrane are those capable of forming film walls or coatings through which drug can pass at a relatively low rate. Suitable polymers are biologically and drug compatible, non-allergenic, and insoluble in and non-irritating to body fluids or tissues with which the device is contacted. Use of soluble polymers is to be avoided since dissolution or erosion of the device would affect the constancy of the drug release, as well as the capability of the device to remain in place, for certain uses. Exemplary materials for fabricating the polymeric membrane include polyethylene, polypropylene, ethylene/propylene copolymers, ethylene/ethyl acrylate copolymers, ethylene/vinyl acetate copolymers, silicone rubbers, especially the medical grade polydimethyl siloxanes, neoprene rubber, chlorinated polyethylene, polyvinyl chloride; vinyl chloride copolymers with vinyl acetate, vinylidene chloride, ethylene, and propylene; ionomer; polyterephthalate; butyl rubber; epichlorohydrin rubbers; ethylene/vinyl alcohol copolymer; ethylene/vinyl acetate/vinyl alcohol terpolymer; ethylene/vinyloxyethanol copolymer; and the like. For best results, the membrane should be selected from polymers of the above classes with glass transition temperatures below room temperature. The polymer may, but need not necessarily, have a degree of crystallinity at room temperature.

Polymeric membranes preferably are cross-linked prior to stretching and using to envelope the matrix. The chemical cross-linking of these polymers can be achieved by incorporation of various cross-linking agents such as peroxides, sulfur, metallic oxides, selenium, tellurium, metallic oxides, diamines, diisocyanates, alkyl phenol disulfides, p-quinine dioxime, tetra-chloro-p-benzoquinone, tetra alkyl thiuram disulfides, 4,4'-dithiomorpholine, sulfur dichloride, and the like, into the polymer followed by a period of heating. Alternatively, cross-linking or vulcanization can be achieved by use of high energy electronbeam radiation such as is provided by a Van de Graaff generator or other types of electron accelerators, or by gamma ray emitters, or by X-ray generators.

Various solid materials can be used to form the solid matrix having the drug distributed therethrough. Essentially, any solid material chemically compatible with the drug and permeable to passage of the drug by diffusion can be employed. Examplary materials for fabricating the matrix include polymethylmethacrylate, polybutylmethacrylate, plasticized or unplasticized polyvinylchloride, plasticized nylon, plasticized soft nylon, plasticized polyethyleneterephthalate, natural rubber, polyisoprene, polyisobutylene, polybutadiene, polyethylene, ethylene-vinyl acetate copolymers, silicone rubbers, especially the medical grade polydimethylsiloxanes, and silicone-carbonate copolymers; hydrophilic polymers such as the hydrophilic hydrogels of esters of acrylic and methacrylic acid (as described in U.S. Pats. No. 2,976,576 and 3,220,960 and Belgian Pat. No. 701,813), modified collagen, cross-linked polyvinylalcohol, and cross-linked partially hydrolyzed polyvinylacetate. It should be noted that we do not claim as our invention the use of any of the foregoing polymers, or the use of any of those noted as suitable membrane materials, except in connection with the particular device of this invention.

Choices of materials for forming the membrane and matrix are governed in large part by the drug to be incorporated in the particular device, as well as by the desired rate of release of the drug. In addition, it is important to successful practice of the invention that the polymeric membrane have a lower permeability to the drug by diffusion than does the matrix. Otherwise, the membrane will not serve as the rate-controlling barrier and the intended controlled release rate will not be obtained. Generally, the martix should have a rate of diffusion of the drug of at least twice that of the polymeric membrane. Preferably, the matrix is selected so that it has a permeability more than 10-fold that of the polymeric membrane for the particular dispersed drug.

Those skilled in the art can readily determine the rate of diffusion of drugs through materials and select suitable combinations of membrane, martix and drug for particular applications. Various techniques can be used to determine the permeability of materials to different drugs. One that has been found to be eminently well suited is to cast or hot press a film of the material to a thickness in the range of 2 to 60 mils. The film is used as a barrier between a rapidly stirred (e.g. 150 r.p.m.) saturated solution of the drug and a rapidly stirred solvent bath, both maintained at constant temperature (typically 37° C.). Samples are periodically withdrawn from the solvent bath and analyzed for drug concentration. By plotting drug concentration in the solvent bath versus time, the permeability constant P of the membrane is determined by the Fick's First Law of Diffusion.

$$\text{Slope of plot} = \frac{Q_1 - Q_2}{t_1 - t_2} = \frac{PAC}{h}$$

wherein $Q_1$=cumulative amount of drug in solvent in micrograms at $t_1$
$Q_2$=cumulative amount of drug in solvent in micrograms at $t_2$
$t_1$=elapsed time to first sample i.e. $Q_1$
$t_2$=elapsed time to second sample i.e. $Q_2$
A=area of membrane in cm.$^2$
C=concentration of drug at saturation
$h$=thickness of membrane in cm.

By determining the slope of the plot i.e.

$$\left[\frac{Q_1 - Q_2}{t_1 - t_2}\right]$$

and solving the equation using the known or measured values of A, C, and $h$, the permeability P constant in cm.$^2$/time of the material or membrane for a given drug is readily determined. Of course, this permeability constant is an inherent characteristic of the material and is unchanged whether the material is used as the inner matrix or the outer polymeric membrane.

Using the above technique, the permeability constant P of progesterone from isotonic solution through different membranes into isotonic solution at 37° C. was found to be:

| Membrane | Permeability Constant (cm.$^2$/hr.) |
| --- | --- |
| Polydimethylsiloxane [1] | $8.0 \times 10^{-2}$ |
| Polyhydroxyethylmethacrylate [2] | $8.0 \times 10^{-3}$ |
| Gum rubber | $2.0 \times 10^{-2}$ |
| Silicone-carbonate copolymer [3] | $4.0 \times 10^{-3}$ |
| Polyethylene [4] | $4.7 \times 10^{-4}$ |
| Ethylene-vinyl acetate copolymer [5] | $7.5 \times 10^{-3}$ |

[1] Dow Corning Silastic 340.
[2] Cross-linked with ethylene dimethacrylate.
[3] General Electric MEM 213.
[4] Low density; melt index of 0.85.
[5] 84% ethylene, 16% vinyl acetate.

Using the above data to design a device of the invention to release progesterone at a constant rate, one would select polydimethylsiloxane as the matrix and any of the other polymers as the polymeric membrane. By the same experimental procedure or with others known to those skilled in the art, matrices and membranes for use with other drugs can be readily identified.

In practicing the invention, one can employ any drug used to treat the body and capable of diffusing through a polymeric membrane at a therapeutically effective rate. The term "drug" is used herein and is intended to be interpreted in its broadest sense as including any composition or substance that will produce a pharmacologic response either at the site of application or at a site remote therefrom.

Suitable drugs for use in therapy with the drug-delivery device of the invention include, without limitation:

(1) Anti-infectives, such as antibiotics, including penicillin, tetracycline, chlortetracycline, bacitracin, nystatin, streptomycin, neomycin, polymyxin, gramicidin, oxytetracycline, chloramphenicol, and erythromycin; sulfonamides, including sulfacetamide, sulfamethazine, sulfadiazine, sulfamerazine, sulfamethizole and sulfisoxazole; antivirals, including idoxuridine; and other anti-infectives including nitrofurazone and sodium propionate;

(2) Anti-allergenics such as antazoline, methapyrilene, chlorpheniramine, pyrilamine and prophenpyridamine;

(3) Anti-inflammatories such as hydrocortisone, cortisone, dexamethasone 21-phosphate, fluocinolone, triamcinolone, medrysone, prednisolone, prednisolone 21-phosphate, and prednisolone acetate;

(4) Decongestants such as phenylephrine, naphazoline, and tetrahydrozoline;

(5) Miotics and antichlolinesterases such as pilocarpine, eserine salicylate, carbachlol, di-isopropyl fluorophosphate, phospholine iodide, and demecarium bromide;

(6) Mydriatics such as atropine sulfate, cyclopentolate, homatropine, scopolamine, tropicamide, eucatropine, and hydroxyamphetamine;

(7) Sympathomimetics such as epinephrine;

(8) Sedatives and Hypnotics such as chloral, pentabarbital sodium, phenobarbital, secobarbital sodium, codeine, (α-bromoisovaleryl) urea, and carbromal;

(9) Psychic Energizers such as 3-(2-aminoprophyl) indole acetate and 3-(2-aminobutyl) indole acetate;

(10) Tranquilizers such as reserpine, chlorpromazine, and thiopropazate;

(11) Androgenic steroids such as methyltestosterone and fluoxymesterone;

(12) Estrogens such as estrone, 17β-estradiol, ethinyl estradiol, and diethyl stilbesterol;

(13) Progestational agents such as progesterone, 19-nor-progesterone, norethindrone, megestrol, melengestrol, chlormadinone, ethisterone, medroxypyrogesterone, norethynodrel and 17α-hydroxy-progesterone;

(14) Humoral agents such as the prostaglandins, for example $PGE_1$, $PGE_2$, and $PGF_2$;

(15) Antipyretics such as aspirin, sodium salicylate, and salicylamide;

(16) Antispasmodics such as atropine, methantheline, papaverine, and methscopolamine bromide;

(17) Anti-malarials such as the 4-aminoquinolines, 8-aminoquinolines, chloroquine, and pyrimethamine;

(18) Antihistamines such as diphenhydramine, dimenhydrinate, tripelennamine, perphenazine, and chlorophenazine;

(19) Cardioactive agents such as benzydroflumethiazide, flumethiazide, chlorothiazide, and aminotrate; and

(20) Nutritional agents such as essential amino acids and essential fats.

Other drugs having the same or different physiological activity as those recited above can be employed in drug-delivery devices within the scope of the present invention.

Drugs can be in different forms, such as uncharged molecules, components of molecular complexes, or non-irritating, pharmacologically acceptable salts such as hydrochloride, hydrobromide, sulphate, phosphate, nitrate, borate, acetate, maleate, tartrate, salicylate, etc. For acidic drugs, salts of metals, amines, or organic cations (e.g., quaternary ammonium) can be employed. Furthermore, simple derivatives of the drugs (such as ethers, esters, amides, etc.) which have desirable retention and release characteristics but which are easily hydrolyzed by body pH, enzymes, etc., can be employed.

The amount of drug incorporated in the drug-delivery device varies depending on the particular drug, the desired therapeutic effect, and the time span for which the device provides therapy. Since the variety of devices in a variety of sizes and shapes are intended to provide dosage regimes for therapy for a variety of maladies, there is no critical upper limit on the amount of drug incorporated in the device. The lower limit to will depend on the activity of the drug and the time span of its release from the device. Thus, it is not practical to define a range for the therapeutically effective amount of drug to be incorporated in or released by the device.

Drug-delivery devices of the invention can take a wide variety of shapes and forms for administering the drugs at controlled rates to different areas of the body. Thus, the invention includes external and internal drug-delivery devices such as skin patches, sublingual or buccal tablets, peroral dosage forms, implantates for releasing a drug in the tissues of a living organism, pessaries, prosthesis, artificial glands, vaginal or rectal suppositories, cervical rings, troches, drug-dispensing intrauterine devices, and ocular inserts (as described in U.S. Pat. No. 3,416,530).

In each instance, the drug-delivery device has an inner matrix containing the drug surrounded by a polymeric membrane and is of appropriate known shape for implantation or insertion in the desired body tissues or cavities, respectively, or for application to a particular body area.

Figure 2:
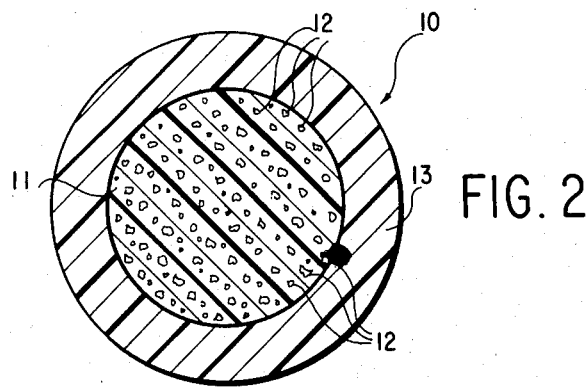
FIG. 2 is a side cross-sectional view of another configuration of the drug-delivery device of the invention.
Figure 3:
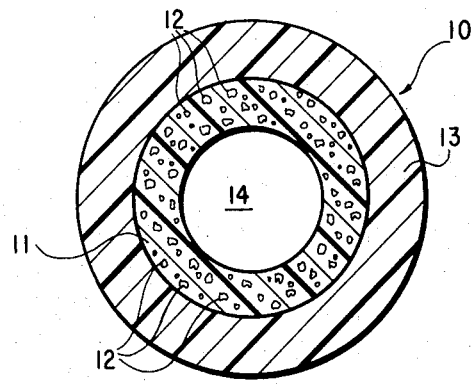
FIG. 3 is a side cross-sectional view of yet another configuration of the drug-delivery device of the invention.

As illustrated in FIG. 2, the drug dosage form can be spherical in nature. In addition, the matrix need not fill the entire interior of the device. Thus, as illustrated in FIG. 3, solid matrix 11 having particles of drug 12 dispersed therethrough can be a tube, sphere, or the like concentric with continuously contracting polymeric membrane 13. And, matrix 11 can enclose a central space or void 14. In this embodiment, molecules of drug 12 will diffuse to the interior and exterior surfaces of matrix 11. Molecules reaching the exterior surface of matrix 11 will migrate through membrane 13 to the outer surface of the drug-delivery device and be removed by absorption in body tissues or fluids. Drug molecules migrating to the interior surface of matrix 11 will form a thin layer of drug which will create an equilibrium and prevent further migration into cavity or void 14.

Drug-delivery devices of the invention are easily fabricated. Drug, preferably in particulate form, is mixed with the matrix material, which can be in solid, semisolid, or liquid form at the time, and distributed therethrough by ballmilling, calendering, stirring, shaking, or the like. Where the drug is chemically compatible with monomers or prepolymers used to form the matrix, the drug can be added at this earlier stage and the matrix formed *in situ*. The matrix material, however made and having the drug distributed therethrough, can then be formed to a solid shape by molding, casting, pressing, extruding, drawing, or like processes. Depending on the material used to form the matrix, curing may be necessary at this stage. Thereafter, the heat shrinkage polymeric membrane is applied by wrapping or laminating according to techniques well known in themselves. The membrane is next heat shrunk as previously described. Alternatively, the membrane can be cold formed by drawing, stamping, swaging, etc. and then used to envelop the pre-formed matrix. Thus, the polymeric membrane in its stretched state, can be used as the form for shaping the matrix. A preformed shape of the polymeric membrane such as a tube or capsule, can be filled with matrix in semi-solid or liquid form having drug distributed therethrough. Thereafter, the matrix can be converted to a solid by curing and the polymeric membrane sealed about the matrix material. Other procedures, well known in themselves to those skilled in the art, can be used to fabricate the drug-delivery devices of the invention.

The following examples will serve to illustrate the invention without in any way being limiting thereon.

EXAMPLE I

Progesterone, 33 parts by weight, is mixed into 67 parts of medical grade room temperature vulcanizing silicone rubber (polydimethyl siloxane). The resulting liquid mixture is molded into a T-shape of round cross-sectional diameter. The horizontal arm of the T is ½ inch in length and the vertical section is 1-inch in length. The cross-sectional diameter is 1/16 inch.

Molecularly bi-axially oriented, heat shrinkable polyethylene film, of 2 mil thickness is embossed, by using conventional metal stamping practice, with the shape of the above-described T to a depth corresponding to half the thickness of the T. The silicone rubber T is then sandwiched between two pieces of the heat shrinkable polyethylene in the embossed sections so that the T is completely enveloped by the film. The film is then heat sealed and cut around the periphery of the T. The enshrouded T is then heated for three seconds at 300° F. resulting in shrinkage of the film and effecting a tight and intimate contact of the film with the drug-containing silicone T.

The resulting device is inserted into the uterine lumen through the cervix and controls fertility by releasing a contraceptively effective amount of progesterone on a continuous basis. As the matrix decreases in size with loss of progesterone, the polyethylene film contracts about the matrix thereby maintaining the intimate contact required by constancy of drug release.

EXAMPLE II

Progesterone, 35 parts by weight, is mixed into 65 parts of medical grade, room temperature vulcanizing silicone rubber (polydimethyl siloxane). The resulting liquid mixture is then injected into heat shrinkable tubing composed of a copolymer of ethylene and vinyl acetate of 82 percent ethylene and 18 percent vinyl acetate. The tubing is 1.5 inches long and of circular cross-section of 3/32 inch O.D. and 1/16 inch I.D. The tubing is of a type rendered heat shrinkable by inter-molecular cross-linking followed by molecular orientation as described earlier. The injection of the liquid progesterone/silicone mixture is interrupted by the placement of three ethylene/vinyl acetate plugs along the length of the tube at equally spaced intervals. These round plugs are of the same composition as the tube, and are of 1/16 inch diameter and 1/32 inch thick. After joining the two ends of the filled tubing by heat sealing or cementing, the resulting torus is exposed for 5–15 seconds to air heated to 280° F. to promote shrinkage of the tubing around the drug-containing matrix. The three plugs serve as bulkheads to compartmentalize the drug-delivery device.

This device can be placed in the vagina, at the mouth of the cervix, and used to administer progesterone at a rate maintained constant by contraction of the tube about the matrix.

EXAMPLE III

Bacitracin, 18 parts by weight, is mixed into 72 parts of natural gum rubber on a conventional two-roll rubber mill. The mix, so prepared, is then shaped into the form of a rod, 1/16 inch in diameter, by extrusion through a circular die. A section of this rod, 1/2 inch in length, is then covered with a layer of film of rubber hydrochloride previously rendered heat shrinkable via molecular orientation. The rubber hydrochloride film, 1 mill thick, is wrapped in a single layer about the medicament-containing core with an overlap of 0.002 inch. The rubber hydrochloride film is heat sealed along the overlap and at the end of the rod. The sealed assembly is then subjected to a heat shrinking operation by exposure for five seconds to air at 300° F., thus creating the desired intimacy of contact of the rubber hydrochloride membrane with drug-containing core. Depending upon the tightness of the original wrap operation, the shrinkage so effected by heat is approximately 10 percent of the potential shrinkage, thus leaving sufficient reserve shrinkage to permit the membrane to maintain intimate contact with the core, even though the volume of the latter be diminished as the drug diffuses out.

EXAMPLE IV

Tetracycline, 40 parts by weight, is mixed into 60 parts of cis-polybutadiene rubber in a Banbury internal mixer, which is conventionally used in the rubber industry for mixing rubber with additives. The mix, so prepared, is then shaped, by molding under compression, into an oblate spheroid whose major axis is approximately 1/2 inch and whose minor axis is 1/4 inch.

A polymeric film is then made by extrusion through a slit-die, of a copolymer of 85 parts of ethylene with 15 parts by weight of vinyl chloride. This film, approximately 2.0 mils thick, is then irradiated with a high energy beam of electrons to a radiation level of 1.0 megarad. The film is then stretched bi-axially to 100 percent extension along each axis.

The shape of the above-described spheroid is then stamped into the film to a depth of half of the spheroid. The spheroid is placed in the depression of the film and covered with the stamped portion of a second similarly treated film. The two films are sealed and cut where they meet around the periphery of the spheroid and the spheroid, so encapsulated with the cross-linked and oriented film of ethylene/vinyl chloride copolymer, is heated for six seconds at 275° F. in an air oven. This treatment causes the film to shrink about the matrix of polybutadiene to establish an intimacy of contact, which persists even though the tetracycline content is lost through the membrane walls by diffusion. By this procedure, there is obtained a device for administering tetracycline antibiotic at a controlled rate.

While the invention has been shown and described and pointed out with reference to certain preferred embodiments thereof, those skilled in the art will appreciate that various changes, modifications, substitutions, and omissions can be made by those skilled in the art without departing from the spirit of the invention. It is intended, therefore, that the invention be limited only by the scope of the claims which follow.

What is claimed is:

1. A method of making an improved drug delivery device of the type comprised of: (a) a solid inner matrix material having drug dispersed therethrough, said inner matrix being permeable to passage of said drug by diffusion; and (b) an outer polymeric membrane, insoluble in body fluids, surrounding said inner matrix, said polymeric membrane being permeable to passage of said drug by diffusion but at a lower rate than through said inner matrix; said method comprising:

dispersing drug in a polymeric matrix permeable to passage of the drug by diffusion;

enveloping said matrix with a molecularly oriented, heat shrinkable polymeric membrane, permeable to passage of the drug by diffusion but at lower rate than through said matrix so that the matrix and membrane are in intimate surface contact;

sealing the membrane about the matrix; and heating the membrane to cause it to shrink about the matrix.

2. The method of claim 1 in which the membrane is cold formed prior to enveloping the matrix therewith.

3. The method of claim 1 in which the membrane is heated to a temperature of about 200° to 400° F. for a period of less than about one minute to cause the membrane to shrink about the matrix.

4. The method of claim 1 in which the membrane is heat shrunk to from about 25% to 75% of its dimension in one or more directions.

References Cited

UNITED STATES PATENTS

| | | | |
|---|---|---|---|
| 3,598,122 | 10/1971 | Zaffaroni | 128—268 |
| 3,022,543 | 2/1962 | Baird et al. | 117—7 |
| 3,516,942 | 6/1970 | Scarpelli | 264—342 R |
| 3,577,512 | 5/1971 | Shepherd et al. | 424—19 |
| 3,518,340 | 6/1970 | Raper | 424—19 |
| 3,551,556 | 12/1970 | Kliment et al. | 128—156 |

CHARLES E. VAN HORN, Primary Examiner

F. FRISENDA, JR., Assistant Examiner

U.S. Cl. X.R.

264—342 R, Dig. 037; 424—19, 21